(12) United States Patent
Olson et al.

(10) Patent No.: US 6,867,568 B1
(45) Date of Patent: Mar. 15, 2005

(54) BATTERY FINISH CHARGE DEVICE

(76) Inventors: John Olson, 1520 Findlay Way, Boulder, CO (US) 80305; Timothy L. Feaver, 1304 Caledonia Cir., Louisville, CO (US) 80027; Philip C. Lyman, 991 Rainbow Way, Boulder, CO (US) 80303

( * ) Notice: Subject to any disclaimer, the term of this patent is extended or adjusted under 35 U.S.C. 154(b) by 75 days.

(21) Appl. No.: 10/218,854

(22) Filed: Aug. 13, 2002

Related U.S. Application Data
(60) Provisional application No. 60/311,853, filed on Aug. 13, 2001.

(51) Int. Cl.[7] .................................................. H02J 7/04
(52) U.S. Cl. .................................... 320/162; 320/137
(58) Field of Search ........................... 320/162, 157, 320/152, 151, 140, 137, 134, 132

(56) References Cited

U.S. PATENT DOCUMENTS

| | | | |
|---|---|---|---|
| 3,758,839 A | 9/1973 | Medlar | 320/32 |
| 4,218,644 A | 8/1980 | Bourke et al. | 320/44 |
| 4,450,401 A | 5/1984 | Lambert et al. | 320/22 |
| 4,647,834 A | 3/1987 | Castleman | 320/43 |
| 5,080,059 A * | 1/1992 | Yoshida et al. | 123/198 R |
| 5,422,822 A * | 6/1995 | Toyota et al. | 702/63 |
| 5,440,221 A | 8/1995 | Landau et al. | 320/22 |
| 5,477,125 A | 12/1995 | Ettel et al. | 320/20 |
| 5,633,576 A | 5/1997 | Rose et al. | 320/23 |
| 5,698,967 A | 12/1997 | Baer et al. | 320/48 |
| 5,701,068 A | 12/1997 | Baer et al. | 320/15 |
| 5,965,998 A | 10/1999 | Whiting et al. | 320/165 |
| 6,229,287 B1 | 5/2001 | Ferris et al. | 320/141 |
| 6,304,062 B1 * | 10/2001 | Batson | 320/134 |
| 6,353,304 B1 | 3/2002 | Atcitty et al. | 320/116 |

* cited by examiner

*Primary Examiner*—Lawrence Luk
(74) *Attorney, Agent, or Firm*—Donald W. Margolis

(57) ABSTRACT

A system for charging batteries by applying a high voltage finish charge to a battery with an electronic charging device connected in series between a state-of-the-art charging system or alternator and the to-be-charged battery, without the use of any other external power source.

24 Claims, 5 Drawing Sheets

BATTERY FINISH CHARGE DEVICE

RELATED APPLICATIONS

This application hereby claims the benefit under title 35, United States Code, Section ii 9(e) of any U.S. provisional application 60/311,853, filed Aug. 13, 2001.

BACKGROUND OF THE INVENTION

1. Field of the Invention

The present invention relates to a system for charging batteries, and more specifically to a system for applying a high voltage finish charge to a battery with an electronic charging device connected in series between a state-of-the-art charging system or alternator and the to-be-charged battery, the finish charge system being designed to use the electric power from the state-of-the-art charger or alternator, and without the use of any other external power source.

2. Description of Prior Art

Most lead-acid batteries are chronically undercharged because they use voltage limited state-of-the-art charging devices that cause the current to decrease at the end of the charging process. When using such systems an extended charging time is required to fully charge the battery, which time is often not taken. In some instances a separate finish charger is connected to a separate power source is applied to finish charging the battery. Many forms of battery finish chargers are known. However, currently chargers that perform the finish charging function are, in general, designed to include both a power generation source, or standard charger, and a finish charge controller. As a result existing finish charger devices duplicate the function of the normal state-of-the-art charger, and a finish charge controller, thereby requiring an excess of equipment and expense for most applications. Alternatively, pulsed charging during the entire lead-acid battery charging cycle has been used to provide a finish charge, but again requires an extended charging time.

It is speculated that sealed lead-acid batteries require a high voltage finish charge due to the interference of the oxygen cycle with the charging of the negative plate. After successive charging of lead-acid batteries that continuously remain in a partially uncharged state, the batteries tend to lose recharging capacity due to crystallization of high resistance lead sulfate at larger or electronically isolated domains. Fortunately, high voltage finish charging also re-charges such high resistance lead sulfate domains to allow the batteries to maintain or recover full voltage capacity. However, most state-of-the-art chargers are voltage limited, and therefore do not have the capability to provide high voltage finish charging.

Lead-acid batteries used in a vehicle for deep cycle use, for example such as recreational vehicles, are charged by the vehicles voltage limited alternator. However, high voltage finish charging is not possible using the vehicles alternator since the rest of the vehicle is connected in series to the alternator and may be damaged if subjected to high finish charging voltages.

Use of pulsed charging generally uses high frequency pulses during the entire charging process. However, such pulsing has limited benefit during bulk charging and increases the amount of time required to charge a battery as compared to a normal state-of-the-art constant current charger. Also, the pulse frequency may be too high to perturb the oxygen cycle at the end of charge. In addition, none of the known finish charging systems draws their power from a state-of-the-art primary charging system or alternator. It is therefore seen that there is a need for a battery charge finishing device for use between a primary charger or alternator power source and a battery (6V, 12V, 24V or other voltage), and more specifically to a system for applying a high voltage finish charge to a battery with an electronic finish charging device having a unique circuit connected in series between such a standard charging system and the to-be-charged battery, the finish charge system being designed to use the electric power from the standard charger or alternator without the use of any other external power source.

SUMMARY OF THE INVENTION

Accordingly, it is an object of the present invention to provide new system for charging batteries using the power from a conventional state-of-the-art charger or alternator and impressing an advantageously higher voltage finish charge on a battery by use of the finish charge device of the present invention.

It is another object of the present invention to provide a battery finish charging device for use between a primary state-of-the-art charger or alternator power source and a battery (6V, 12V, 24V or other voltage), in which a microprocessor system controls the high voltage finish charge and current interruption using specific novel.

It is a further object of the present invention to provide a battery charge finishing device having a switching system that selectively isolates external power sources from feedback from the high voltage of the finish charge device when it is operating.

It is still yet a further object of the present invention to provide a battery charge finishing device having a mechanism for sensing a load in the power circuit external to the charge finishing device when the charge finishing device is active, and which also switches the finish charge off when an external load is sensed, and simultaneously reconnects the battery to the external power load.

It is a still yet a further object of the present invention to provide a battery charge finishing device having a microprocessor control to turn the charge finishing device on and off at pre-determined intervals, and which mechanism, in response to the sensed voltage of the battery determines whether to continue finish charging the battery or switch off the finish charging device and wait for a pre-determined interval before repeating the sequence.

A further object of the present invention is to provide such microprocessor control that would then sense the battery voltage to determine if the battery is discharged to another predetermined lower voltage before initiating another charging and finish charging cycle. A related object of the present invention is to provide such battery charge finishing devices having a functional connector mechanism.

As described in greater detail below, since the finish charge is best applied at the end of the state-of-the-art charge, the charge finishing system of the present invention includes unique circuitry, a programmed microprocessor and appropriate voltage measurement capability to determine the appropriate time to provide the finish charge to the to-be-charged battery. The unique circuitry and programmed microprocessor also prevents the finish charge from being reapplied until after the new or previously finish charged battery has been discharged.

In the practice of the present invention, the finish charge can be either a constant current with no voltage limit for a predetermined time, or the finish charge can consist of a pulsed or current interrupt sequence within the microprocessor, also with no voltage limit and also for a predetermined time. Both variations of the present invention force the voltage of the battery to go above the voltage control level of the state-of-the-art charger. During the finish charging, the unique circuitry and microprocessor isolate the state-of-the-art charger or alternator from the battery voltage. The finish charge device of the present invention also has minimal parasitic current draw when the finish charge device is at rest.

Accordingly, the present invention provides finish charge devices connected in series between a battery and a state of the art and charger or alternator. The finish charge devices of the present invention allow an advantageous higher voltage finish charge to the battery, and that uses the power from the state of the art charger and has no other external power source. As is detailed below, the finish charge device of the present invention is designed for use with 6V, 12V, 24V or other voltage lead-acid batteries, but may, with appropriate adaptations, be used to finish charge any secondary battery and use substantially any state-of-the-art charger for its power source.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

DETAILED DESCRIPTION OF THE INVENTION

The accompanying drawings illustrate complete preferred embodiments of the present invention according to the best modes presently devised for the practical application of the principles thereof, and in which.

DETAILED DESCRIPTION OF THE INVENTION

Figure 1:
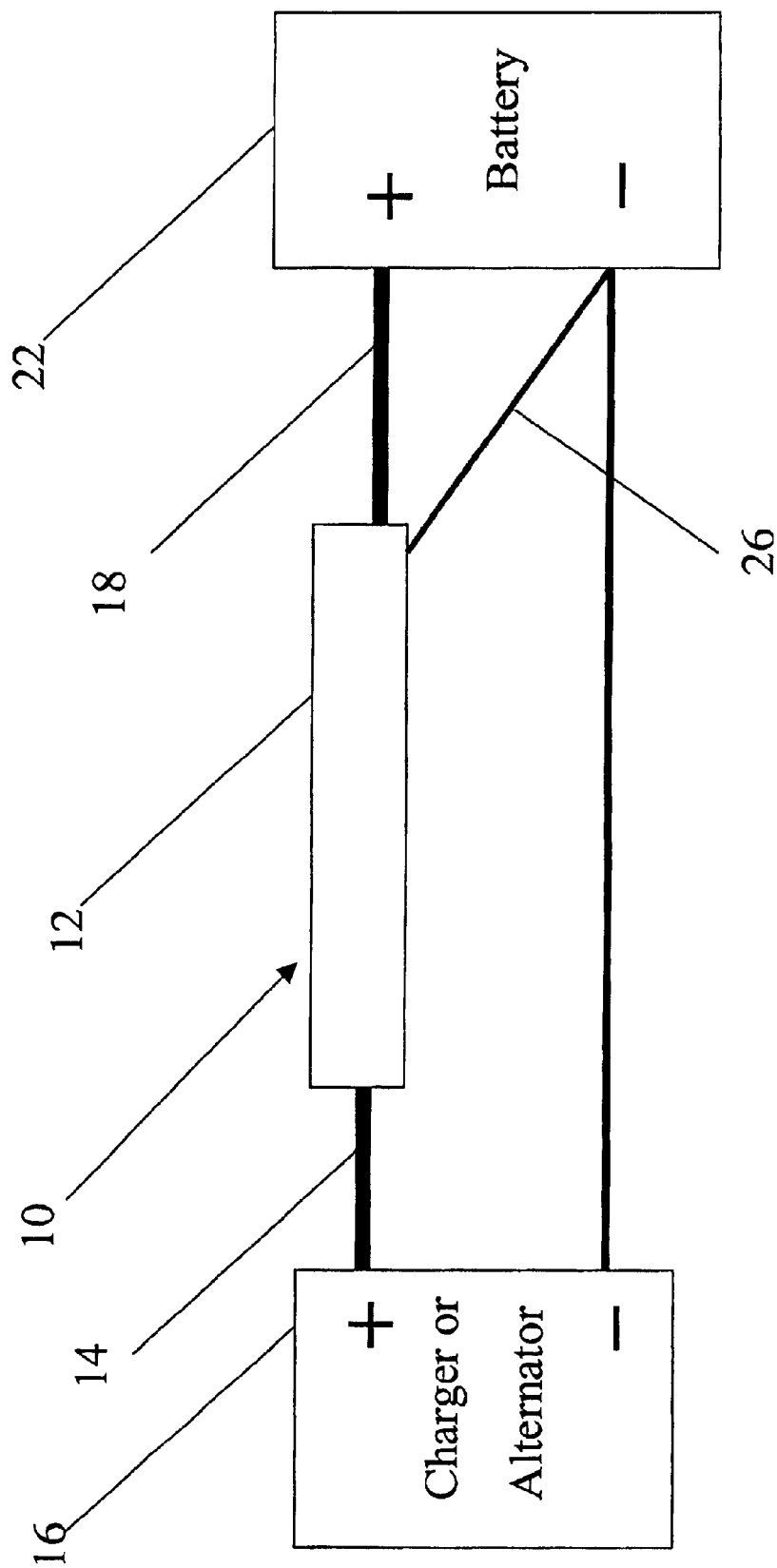
FIG. 1 shows a representation of a finish charge device with leads connected to a external power source (charger or alternator) and a batteryaccording to the present invention.

FIG. 1 shows a representation of a finish charge device, generally 10, within housing 12 with a plurality of leads, according to the present invention. Housing 12 in which finish charge device 10 is located is connected to input lead 14 from a state-of-the-art charger or alternator 16, while output lead 18 connects it to the to the to-be-charged battery 22, preferably positive terminal 24, see FIG. 4. Voltage sensor lead 26 also extends from housing 12 to connect the electronic circuitry of finish charge device 10 to the other (negative) terminal, not shown, of battery 22. Finish charge device 10 is designed for use with 6V, 12V, 24V or other voltage lead acid batteries, but may, with appropriate adaptations, be used to finish charge any secondary battery and use any voltage current or future state-of-the-art charger for its power source.

Finish charge device 10 of the present invention is designed to be connected in series between a state of the art battery charger or alternator 16 and a to-be-charged battery 22. As described in greater detail below, finish charge device 10 of the present invention provides an advantageously higher voltage finish charge to battery 22. Finish charge device 10 uses power from the state-of-the-art charger or alternator 16, and has no other, and requires no other external power source. Housing 12 is preferably sealed and can be made of plastic, metal or other suitable material. In the preferred embodiment shown the size of housing 12 is approximately six inches in length, three inches in width and one inch in height. Of course the size of housing 12 may vary depending on the configuration of the electronics and circuitry, the size of the battery, or the specific desired functionality of the charge control device 10.

Figure 2:
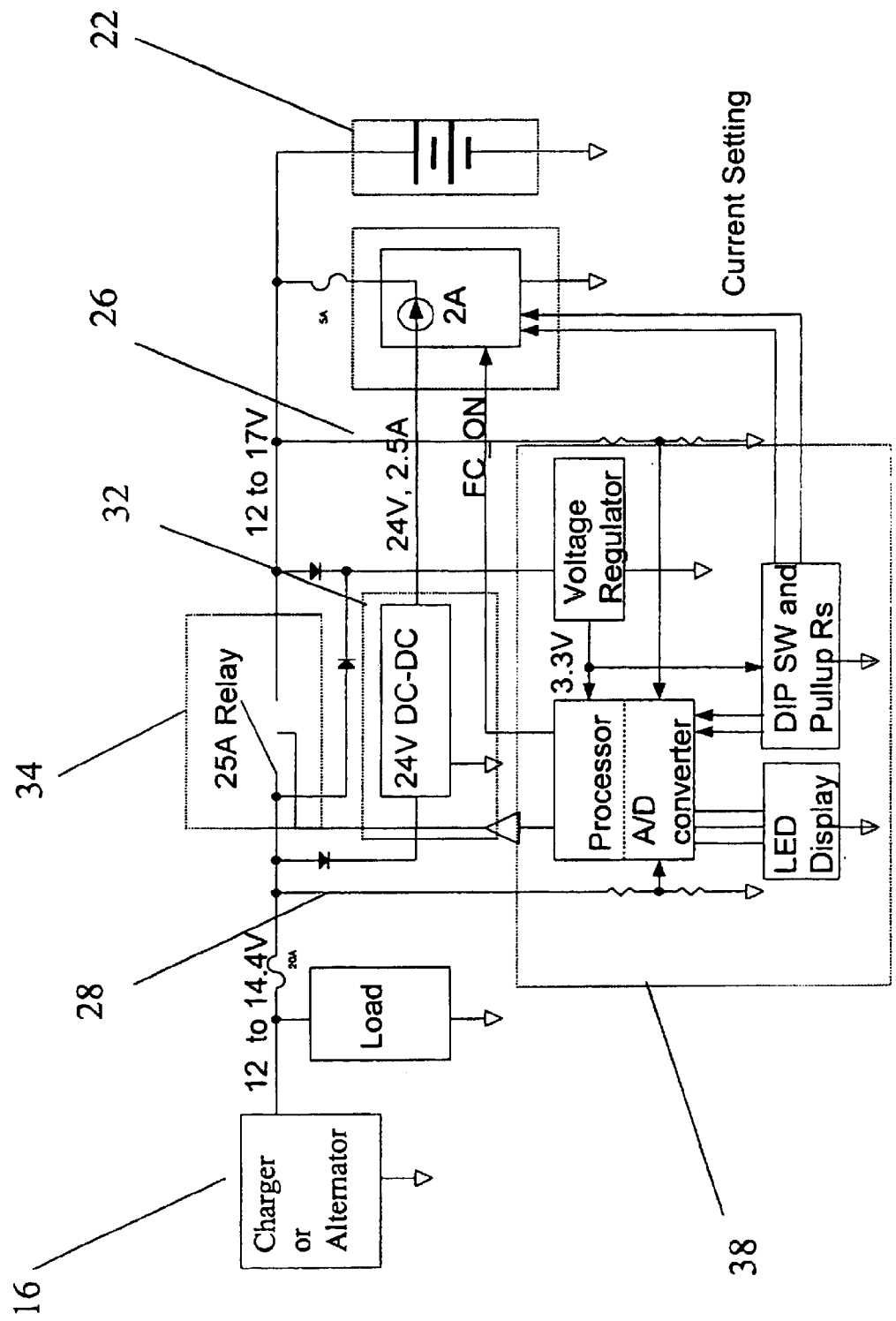
FIG. 2 shows a block schematic of a preferred circuit for the finish charge device utilizing either a state-of-the-art battery charger or an alternator as a power source, according to the present invention.

Now referring to FIG. 2, a basic circuit schematic of the charge control device 10 that is within housing 12 is shown. Charge control device 10 includes unique electronic circuitry to which the three external leads are connected, input lead 14 from a state-of-the-art charger or alternator 16 output lead 18 connected to the to the to-be-charged battery 22, and voltage sensor lead 26. Input lead 14 connects the unique internal electronic circuitry to the external a state-of-the-art charger or alternator 16. Output lead 18 connects the unique internal electronic circuitry to battery 22.

Figure 4:
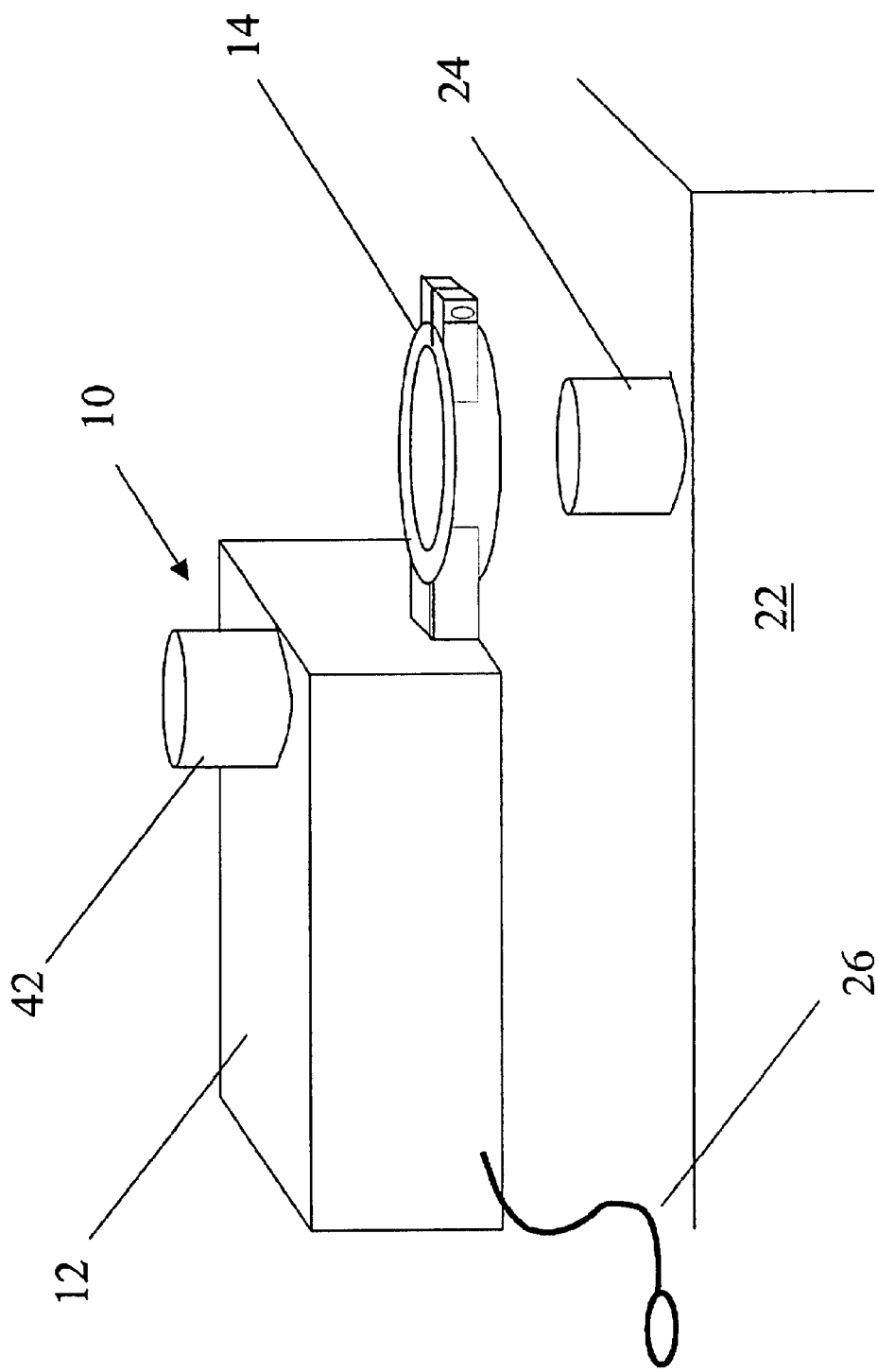
FIG. 4 shows one embodiment of the device of the present invention with integrated connectors for use with automotive battery posts.

Referring to the circuit block diagram shown in FIG. 2, the main components of the circuit are an input voltage sensor 28 which is connected to input lead 14, a finish charge power supply 32, electronic switches 34, battery voltage sensor 36 connected to output lead 18 and to sensor lead 26, and a microprocessor 38. Input voltage sensor 28 and battery voltage sensor 36 may be, for example, a resistor network to divide the voltages down to an input voltage level that is compatible with the analog to digital input circuitry associated with microprocessor 38. The finish charge power supply 32 may be any state-of-the-art dc-dc switching converter. Electronic switch 34 may be a momentary relay, a latching relay, or a pair of field-effect transistors (FETs). These components may be discrete or are carried by one or more electronic circuit board. Output lead 18 and voltage sensor lead 28 carry standard connectors. In the simplest embodiment the connectors are spring loaded electrically conductive clips. It is also possible to integrate the connectors and leads 22and 28, for example in an automotive application as shown in FIG. 4 in which an input automotive terminal 42 and an output automotive terminal 44 are integrated with housing 12. In preferred embodiments the electronic circuitry is mounted on or embedded in a printed circuit board contained in housing 12. Other minor circuit elements may be present in housing 12 to complete the system.

As detailed below, finish charge device 10 may operate either as a constant current charger with no voltage limit operating for a predetermined time, or it may consist of a current interrupt, i.e. pulsed system, also with no voltage limit operating for a predetermined time. In both variations the finish charge power supply 32 forces the voltage going to the battery to go above the voltage control level of the standard state-of-the-art charger or alternator 16, all while maintaining the battery electrically isolated. During the operation of finish charge device 10, electronic switch 34 functions to selectively transfer power between the standard state-of-the-art charger or alternator 16, the finish charge power supply 32, and the battery 22. As described in greater detail below, electronic switch 34 may function in one of three ways: a) to leave battery 22 disconnected from any form of charging (open circuit); or; b) to connect battery 22 to finish charge power supply 32; or, c) to connect battery 22 to standard charger or alternator 16 or external load, see FIG. 2. Electronic switch 34 is controlled by microprocessor 38.

Microprocessor 38 includes a math processor, timers, counters, program memory space carrying programs specific to the functionality of the charge finish device of the present invention, and scratch pad memory space. In addition, microprocessor 38 includes analog voltage measurement capability and is capable of producing output signals. In operation, finish charge power supply 32 receives input power from a standard external state-of-the-art charger or alternator 16 and boosts that charge to the required finish charge voltage output. Power supply 32 generates a constant current output using standard feedback control techniques. The selected current value is sized to match the total capacity, or size, of the battery 22 that is to be charged. Finish charge system 10 can be programmed to produce a constant current finishing charge say for from about 1 A to about 5 A with no voltage limit for from about 1 hour to about 2 hours to finish charging battery 22. Alternatively, it can be programmed to produce a pulsed constant current charge for periods of from about 5 seconds to about 60 seconds followed by a rest, i.e. current-interruption, for periods of from about 5 seconds to about 60 seconds. When used in a pulsed mode finish charging continues for from about 1 to about 4 hours to finish charging battery 22. In both finish charging modes the output voltage of the power supply 32 is allowed to increase, tracking the battery terminal voltage, to provide high voltage for the finish charge.

Figure 3:
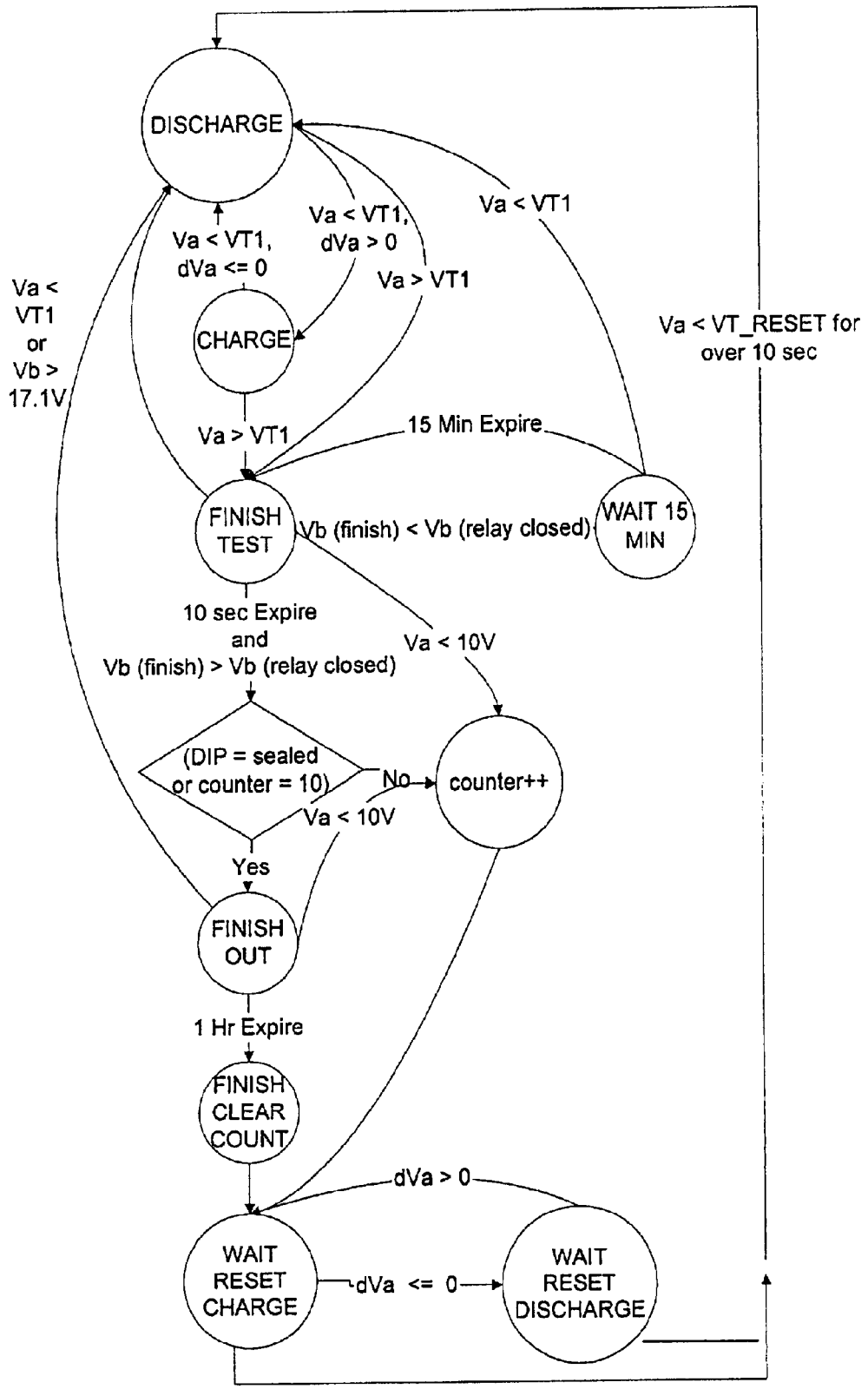
FIG. 3 shows a simplified flow chart of one preferred embodiment of the operation of the present invention.

Referring to FIG. 3, a simplified flow chart of one preferred embodiment of the operation of microprocessor 38 of the present invention is described. So, for example, at a certain given time when the system is not in the finish charge mode and has had a discharge subsequent to the last finish charge, microprocessor 38 checks the battery terminal voltage 36. It is important that the finish charging device 10 be turned on and operate only when the battery 22 is close to being fully charged by a state-of-the art battery charger or alternator 16. For example, where battery voltage sensor 36 is available, the finish charge system 10 is turned on in a voltage limited mode only when the current has decreased to less than about 2 A. To avoid the need for current sensing, the finish charge device 10 will periodically, say about every 15 to about 30 minutes, as programmed, check battery 22 to see if a finish charge is appropriate as described below. If the battery terminal voltage 36 is above about 13.2 V, i.e. battery 22 is being charged by a state-of-the-art charger or alternator 16, microprocessor 38 stores this voltage data and then changes the electronic switch 34 from the state-of the-art charger to the finish charge power supply 32. After a period of about 10 to 15 seconds the battery terminal voltage 36 is measured and then compared with the stored value. If the stored voltage is higher, the battery 22 is not ready for the finish charge so the microprocessor 38 changes the electronic switch 34 back to pre-existing state-of-the-art charger or alternator 16 power. If the stored voltage had been found to be lower, then the stored value then microprocessor 38 would not change the electronic switch 34 until the appropriate finish charge time had elapsed. Following the finish charge 46, 48, see FIG. 5, the microprocessor 38 changes the electronic switch 34 from battery 22 to the state-of-the-art external charger or alternator 16, and load. Art known circuit elements, not shown prevent voltage spikes and current surges during operation of switch 34 that might otherwise damage the pre-existing external charger or alternator 16, and load. Microprocessor 38 continuously samples the line voltage 28. If the finish charge is occurring and the line voltage 28 drops below about 12.8 V for a 12 volt battery, then the electronic switch 34 is changed to reconnect the battery 22 to the external circuit load. Other operations of microprocessor 38 are shown in the flow chart of FIG. 3. Of course the selected operating voltages are changed proportionally for 6V, 12V, 24 V and other voltage batteries.

Alternatively, if the finish charge power supply 32 is providing a current interrupt, pulsed, output, then when in the finish charge mode, the microprocessor 38 switches the finish charge power supply on with no voltage limit output for a duration of say about 15 seconds and then switches it off, i.e. to an open circuit, for a duration of about 15 seconds and then repeats that sequence for a pre-determined period of time.

It is therefore apparent that finish charging device 10 of the present invention functions to give battery 22 a higher voltage finish charge more quickly than a standard charger or alternator 16 as battery 22 approaches a full charge using a standard charger or alternator. The finish charging device 10 uses the power from the standard charger or alternator 16, such as an alternator in a car or a shop charger, and will neither have nor require any other external power source.

Figure 5:
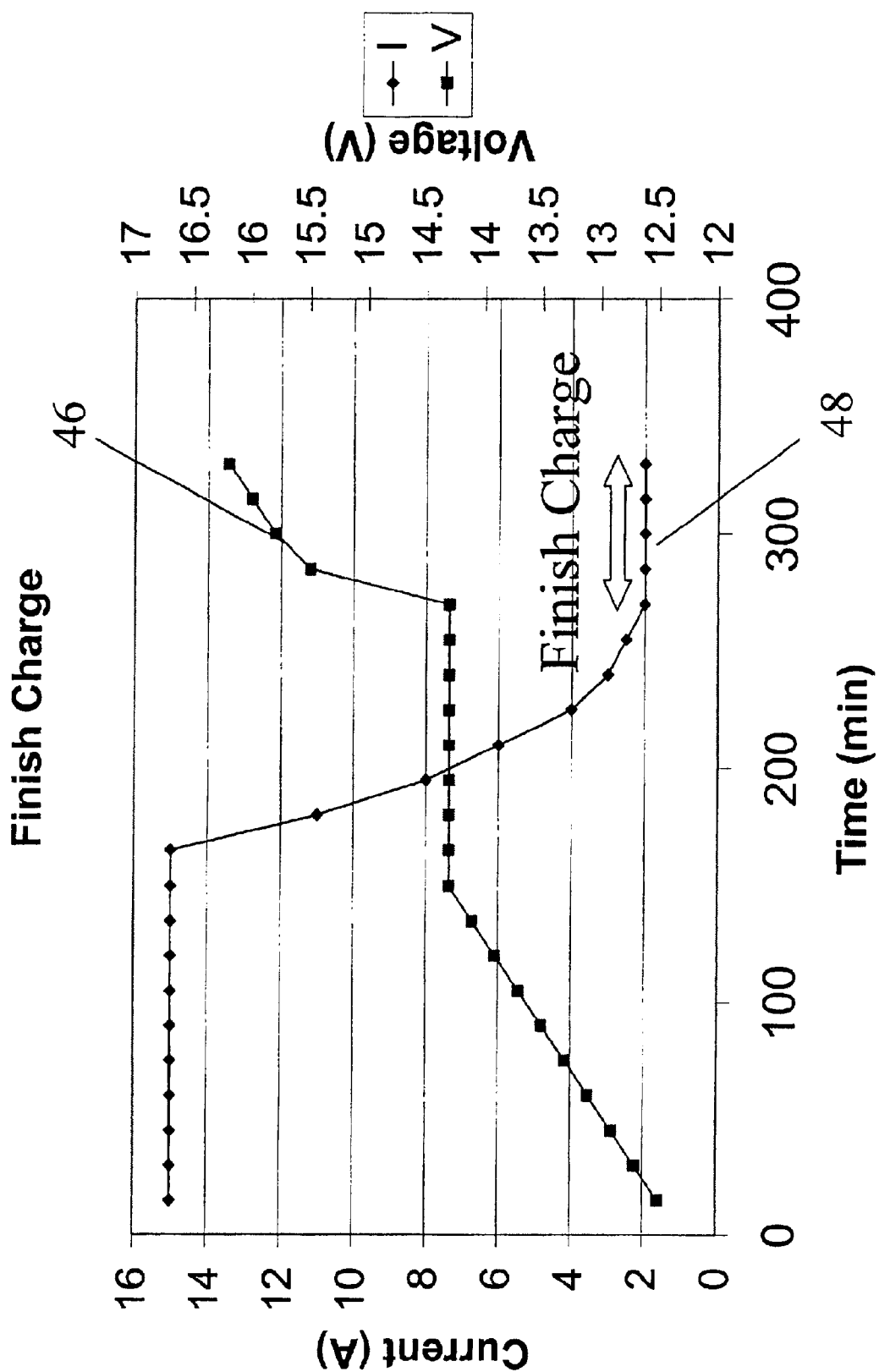
FIG. 5 shows a diagrammatic representation of the current/voltage behavior of a typical voltage limited charge with a high voltage finish charge according to the present invention.

An example of a charge profile using finish charging device 10 of the present invention is shown in FIG. 5. The finish charge device 10 determines when battery 22 is ready for the finish charge by a custom program and then impresses the finish charge on battery 22 in voltage isolation from the finish charging device 10. The finish charge system 10 may apply a constant current 48 resulting in the voltage behavior shown in FIG. 5 at 46. As previously noted, the voltage provided from finish charging device 10 will be higher than the voltage of the standard charger or alternator 16. Microprocessor 38 will then not allow charging or finish charging until battery 22 has been discharged below a predetermined voltage value.

By way of summary, electronic switch 34 functions in three ways. Switch 34 may be positioned: a) to leave battery 22 disconnected, i.e. with an open circuit; b) to connect battery 22 to the finish charge power supply 32; or c) to connect battery 22 to the state-of-the-art charger or alternator 16. These functions of electronic switch 34 are controlled by microprocessor 38, as detailed above. By way of further summary, microprocessor 38 facilitates the higher level functionality of finish charging device 10 of the present invention by using input voltage sensor 28 and battery voltage sensor 36 to measure voltages, by controlling electronic switch 34, by timing the periodic voltage measurements to determine end of charge condition, by executing the finish charges as shown in FIG. 5, by preventing the finish charge from reoccurring prior to a discharge of battery 22, by checking and responding to a demand for power from battery 22 to the external load, and by preventing transient voltages from being transmitted to the state-of-the-art charger or alternator 16. In addition, microprocessor 38 has the ability, when required, to transiently record data and do computing.

The need to support low rate discharges is also required in other applications of finish charging device 10 of the present invention, such as with a recreational vehicle, while a trolling motor application will not need the capability to support a discharge. It is therefore seen that finish charge device 10 of the present invention has several primary functions, such as:

1. Turning on the finish charging system at the appropriate time, i.e when charging of battery 22 by state-of-the-art charger or alternator 16 is nearly complete;
2. Turning off the finish charging system at the appropriate time, i.e when charging of battery 22 is complete; and
3. The ability to execute the high voltage finish charge in isolation from the state-of-the-art charger or alternator 16 power source.

Also, when used in an automotive system, the finish charge device 10 must allow high power discharges, say up to about 400 A, without excessive resistance losses. It is therefore further seen that finish charging device 10 of the present invention provides new concepts in charging batteries using the power from a pre-existing conventional charger or alternator 16 and impressing an advantageously higher voltage finish charge on a battery 22 in a relatively short time. It has been shown how the battery charge finishing device 10 of the present invention is used between a primary state-of-the-art charger or alternator power source 16 and a battery (6V, 12V, 24V or other voltage), and by the use of microprocessor system 38 controls such a high voltage finish charge and current interruption using specific novel circuitry to control and switch the finish charge device. It has been shown how the battery charge finishing device 10 of the present invention uses an electronic switching system 34 that selectively isolates external power sources 16 from feedback from the high voltage of the finish charge device when it is operating, and also from the highly charged battery 22, when appropriate, by sensing a load in the power circuit external to the charge finishing device when the finish charge device is active, and switching the finish charge off when an external load is sensed, and simultaneously reconnecting battery 22 to the external power load. The present invention also provides a battery charge finishing device having a microprocessor control to turn the charge finishing device on and off at predetermined intervals, and in response to the sensed voltage of the battery, and to determine whether to continue finish charging battery 22 or to switch off the finish charging device and wait for a pre-determined interval before repeating the sequence, and then determining if the battery is discharged to another predetermined lower voltage before initiating another charging and finish charging cycle.

While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements that are disclosed herein.

What is claimed is:

1. A finish charge device for a battery having a positive and a negative terminal, including, in combination:
    electronic circuitry;
    a plurality of leads in electrical connection to said electronic circuitry, including an input lead for electrical connection to a standard charger or alternator, an output lead for electrical connection to a terminal of a to-be-charged battery, and a voltage sensor lead for electrical connection to the terminal of such a to-be-charged battery;
    said electronic circuitry including an input voltage sensor in electrical connection to said input lead, a finish charge power supply in electrical connection between a standard battery charger or alternator through said input lead and a to-be-charged battery through said output lead, electronic switches in electrical connection between a standard battery charger or alternator through said input lead and a to-be-charged battery through said finish charge power supply and said output lead and said voltage sensor lead, and wherein all said electronic circuitry components are discrete; and
    a microprocessor in electrical connection with said electronic circuitry and all of its components;
    whereby said microprocessor of said finish charge device is programmed to use input power from a standard charger or alternator or to-be-charged to provide an advantageously higher voltage finish charge to a to-be-charged battery, and wherein said electronic switch functions to selectively transfer input power to said finish charge power supply and then output power at the said advantageously higher voltage to a to-be-charged battery, said electronic switch functions to leave a to-be-charged battery disconnected from any form of charging, or to connect a to-be-charged battery to said finish charge power supply, or to connect a to-be-charged battery to a standard charger or alternator or external load, all as controlled by said microprocessor.

2. The finish charge device of claim 1 wherein said microprocessor includes a math processor, timers, counters, program memory space carrying programs specific to the functionality of said charge finish device, scratch pad memory space and analog voltage measurement capability and wherein said microprocessor is capable of producing output signals, whereby said finish charge power supply receives input power from a standard external standard charger or alternator or the to-be-charged battery and boosts that charge to a required constant current finish charge voltage output using standard feedback control techniques, whereby the selected current value is sized to match the total capacity, or size, of the to-be-charged battery.

3. The finish charge device of claim 1 wherein said microprocessor is programmed to produce a constant current finishing charge with no voltage limit for a selected period of time to finish charging a to-be-charged battery.

4. The finish charge device of claim 3 wherein said microprocessor is programmed to produce a pulsed constant current charge for periods of from about 5 seconds to about 60 seconds followed by current-interruption, for periods of from about 5 seconds to about 60 seconds for a selected period of time to finish charging a to-be-charged battery.

5. The finish charge device of claim 1 wherein said finish charge power supply is any state-of-the-art dc-dc switching converter.

6. The finish charge device of claim 1 wherein said electronic switch is selected from the group of switches consisting of a momentary relay, a latching relay, and a pair of field-effect transistors, and combinations thereof.

7. The finish charge device of claim 1 wherein said electronic circuitry components are carried by one or more electronic circuit board.

8. The finish charge device of claim 1 wherein said output lead and said voltage sensor lead carry standard battery terminal connectors.

9. The finish charge device of claim 8 wherein said connectors and said leads are integrated with a housing carrying said finish charge device and said leads.

10. An electronic battery finish charge device for modifying the current and voltage characterstics of a standard battery charger or alternator in order to finish the charging of a battery having a positive terminal and a negative terminal, including, in combination:

an input lead for electrical connection to a standard charger or alternator an input voltage sensor lead in electrical connection to a standard charger or alternator;

an output lead for electrical connection to the positive terminal of any such battery;

an output voltage sensor lead in electrical connection to the negative terminal of any such battery;

electronic switching means located between any such standard battery charger or alternator and any such battery, said electronic switching means being capable of being set to be in or out of electrical connection to said input lead and said input voltage sensor lead and thence through said input lead and said input voltage sensor lead to any such standard battery charger or alternator, said electronic switching means also being capable of being set to be in or out of electrical connection to said output lead and said output voltage sensor lead to any such battery;

a finish charge power converter for modifying the current and voltage characteristics of the current and voltage of any such standard battery charger or alternator, said finish charge power converter being in electrical connection to said electronic switching means and then, depending upon the setting of said electronic switching means capable of being adjusted to be in electrical connection to any such standard charger or alternator to modify the current and voltage characteristics of any such standard battery charger or alternator, said finish charge power converter also in electrical connection to said electronic switching means, and then, depending upon the setting of said electronic switching means capable of being adjusted to be in electrical connection to said output lead and thence to any positive terminal of any such battery and also to said output voltage sensor lead and thence to any negative terminal of any such battery;

a microprocessor in electrical connection with said input lead and said input voltage sensor lead, with said electronic switching means, said microprocessor using power from any such standard charger or alternator or any such battery to operate said microprocessor, said microprocessor being programmed to sense said voltage from any such standard charger or alternator and also to sense said voltage from any such battery and to adjust said electronic switching means to selectively transfer power from said standard charger or alternator directly to any such battery, or to selectively transfer power to said finish charge power supply to modify the current and voltage characteristics from any such standard battery charger or alternator to provide a finish charge, and wherein said microprocessor operates said electronic switching means to selectively transfer such modified current and voltage power to any such battery, said microprocessor further being capable of operating sad electronic switching means to terminate any current and voltage power transmission between any standard charger or alternator and any such, all as controlled by said microprocessor; whereby said battery charge electronic assembly will selectively use the power from any such standard charger or alternator or any such battery to operate said microprocessor to selectively charge any such battery, or to modify the current and voltage characteristics of said standard battery charger or alternator to apply a modified current and voltage finish charge to any such battery, or to terminate any current and voltage connection between said standard battery charger or alternator to any such battery.

11. The electronics battery finish charge device of claim 10, wherein said microprocessor, said finish charge power converter and said voltage input and output sensor leads include means for determining a near end of charge condition, whereby the said electronics battery finish charge device operates said finish charge power converter modifies the current and voltage of the said standard battery charger to create a finish charge.

12. The battery finish charge device of claim 10 wherein said finish charge power converter and said electronic switching means include additional means to convert power from any such battery charger or alternator to a higher finish charge voltage.

13. The battery finish charge device of claim 12 wherein said finish charge power converter is a direct current-direct current power converter.

14. The battery finish charge device of claim 11 wherein said input voltage sensor lead, said output sensor lead, said electronic switching means and said microprocessor include additional means for measuring and recording the voltage of any such battery while any such battery is being directly charged by any such standard charger, without modification of the current or voltage, then, when a predetermined voltage is sensed, activating said electronic switching means to interrupt charging of any such battery by any such battery charger or alternator, then impressing a constant current charge of predetermined magnitude from said finish charge power converter, then measuring and recording the voltage of any such battery during the constant current charge of predetermined magnitude, then comparing the voltage of any such battery before and after impressing such a constant current charge of predetermined magnitude and determining whether to return to charging of any such battery by any such standard battery charger or alternator or to continue to impress the current charge of predetermined magnitude, whereby the end of charge condition is evaluated and the constant current charge of predetermined magnitude is continued or discontinued or the finish charge is withheld or applied to any such battery.

15. The battery finish charge device of claim 10 wherein said electronic switching means, said microprocessor and said leads include additional means to disconnect any such battery from any such standard battery charger or alternator, and thence to connect said finish charge power converter to any such battery.

16. The battery finish charge device of claim 10 wherein said electronic switching means and said microprocessor include additional means to provide an intermediate position of said switching means such that any such battery may be disconnected from both any such standard battery charger or alternator and from said finish charge power converter, whereby any such battery is at open-circuit.

17. The battery finish charge device of claim 10 wherein said finish charge power converter and said electronic switching means include additional means to provide a constant current finish charge of predetermined magnitude, whereby any such battery terminal voltage is allowed to increase above the voltage limit of any such standard battery charger or alternator and wherein the constant current finish charge of predetermined magnitude continues for a predetermined period of time.

18. The battery finish charge device of claim 10 wherein said finish charge power converter, said microprocessor and said electronic switching means include additional means to provide a constant current charge, whereby any such battery terminal voltage is allowed to increase above the voltage limit of any such standard battery charger or alternator for a predetermined time and then rest for a predetermined time, and wherein an on and off sequence continues for a predetermined period of time.

19. The battery finish charge device of claim 10 wherein said microprocessor and said electronic switching means include additional means to establish when a criteria for disconnection or connection of any such battery to any such standard battery charger or alternator or connection of any such battery to said finish charge power converter are sensed, and then to take action to effect the proper switch connection.

20. The battery finish charge device of claim 10 further including a sealed enclosure to protect the device.

21. The battery finish charge device of claim 20 wherein an input lead is attached to said enclosure of said device to allow said device to be both electrically connected and mechanically secured to any such positive terminal of any such battery.

22. The battery finish charge device of claim 10 wherein a to-be-charged battery is present and connected to said output lead and to said output voltage sensor lead, and wherein said battery is a 6 volt or 12 volt or 24 volt lead-acid battery.

23. The battery finish charge device of claim 10 wherein said input voltage sensor lead, said output voltage sensor lead, said microprocessor and said electronic switching means include additional means to prevent the application of a subsequent finish charge to any such battery prior to the discharge of any such battery.

24. The battery finish charge device of claim 10 wherein said input voltage sensor lead, said output sensor lead, said microprocessor and said electronic switching means include additional means to sense a load demand from any such battery and respond by disconnecting said finish charge power converter and reconnecting any such standard battery charger or alternator.

* * * * *